United States Patent
Bürge et al.

(10) Patent No.: US 11,161,791 B2
(45) Date of Patent: Nov. 2, 2021

(54) ADDITIVE FOR INTERNAL POST TREATMENT OF MINERAL BINDER COMPOSITIONS

(71) Applicant: SIKA TECHNOLOGY AG, Baar (CH)

(72) Inventors: Christian Bürge, Schafisheim (CH); Gilbert Mäder, Marthalen (CH); Franz Wombacher, Jonen (CH)

(73) Assignee: SIKA TECHNOLOGY AG, Baar (CH)

( * ) Notice: Subject to any disclaimer, the term of this patent is extended or adjusted under 35 U.S.C. 154(b) by 517 days.

(21) Appl. No.: 15/765,991

(22) PCT Filed: Oct. 17, 2016

(86) PCT No.: PCT/EP2016/074842
§ 371 (c)(1),
(2) Date: Apr. 4, 2018

(87) PCT Pub. No.: WO2017/067872
PCT Pub. Date: Apr. 27, 2017

(65) Prior Publication Data
US 2018/0282233 A1    Oct. 4, 2018

(30) Foreign Application Priority Data
Oct. 21, 2015 (EP) .................................. 15190750

(51) Int. Cl.
*C04B 32/00*        (2006.01)
*C04B 28/04*        (2006.01)
(Continued)

(52) U.S. Cl.
CPC ........ *C04B 40/0039* (2013.01); *C04B 14/202* (2013.01); *C04B 24/02* (2013.01);
(Continued)

(58) Field of Classification Search
USPC ......................................... 106/638, 713, 716
See application file for complete search history.

(56) References Cited

U.S. PATENT DOCUMENTS 6,231,970 B1     5/2001 Andersen et al.
7,838,597 B2 *  11/2010 George .................. C04B 28/02
                                                      525/56

(Continued)

FOREIGN PATENT DOCUMENTS

CA        2 904 811 A1     9/2014
CN     102 108 027 A       6/2011
(Continued)

OTHER PUBLICATIONS

May 1, 2020 Office Action issued in Australian Patent Application No. 2016341065.
(Continued)

*Primary Examiner* — James E McDonough
(74) *Attorney, Agent, or Firm* — Oliff PLC

(57) ABSTRACT

An admixture for mineral binder compositions, in particular an after-treatment agent for mineral binder compositions, including at least one water-absorbing substance and at least one shrinkage reducer.

13 Claims, 2 Drawing Sheets

(51) Int. Cl.
- *C04B 40/00* (2006.01)
- *C04B 14/20* (2006.01)
- *C04B 24/02* (2006.01)
- *C04B 24/38* (2006.01)
- *C04B 14/00* (2006.01)
- *C04B 16/00* (2006.01)
- *C04B 24/00* (2006.01)
- *C04B 28/00* (2006.01)
- *C04B 28/10* (2006.01)
- *C04B 9/12* (2006.01)
- *C04B 7/00* (2006.01)
- *C04B 7/34* (2006.01)
- *C04B 111/20* (2006.01)
- *C04B 111/34* (2006.01)
- *C04B 103/46* (2006.01)

(52) U.S. Cl.
CPC ............ *C04B 24/383* (2013.01); *C04B 28/04* (2013.01); *C04B 2103/465* (2013.01); *C04B 2111/20* (2013.01); *C04B 2111/2038* (2013.01); *C04B 2111/29* (2013.01); *C04B 2111/343* (2013.01)

(56) References Cited

U.S. PATENT DOCUMENTS

| | | | |
|---|---|---|---|
| 8,653,186 B2* | 2/2014 | Nicoleau | C04B 40/0042 524/791 |
| 2006/0234871 A1* | 10/2006 | Dalrymple | C09K 8/508 507/211 |
| 2010/0285224 A1 | 11/2010 | Fisher | |
| 2011/0297049 A1* | 12/2011 | Zapf | C04B 40/0039 106/803 |
| 2012/0298012 A1 | 11/2012 | Berke et al. | |
| 2015/0344368 A1* | 12/2015 | Hesse | C04B 40/0042 524/3 |
| 2018/0111876 A1* | 4/2018 | Zampini | C04B 14/06 |

FOREIGN PATENT DOCUMENTS

| | | | | |
|---|---|---|---|---|
| DE | 195 39 250 A1 | 5/1996 | | |
| DE | 198 12 246 A1 | 9/1999 | | |
| EP | 1 138 697 A1 | 10/2001 | | |
| EP | 1 348 729 A1 | 10/2003 | | |
| EP | 1 061 089 B1 | 3/2004 | | |
| EP | 2281424 A1 * | 2/2011 | ............ | A01B 29/04 |
| EP | 2 821 424 A1 | 1/2015 | | |
| EP | 2821424 A1 * | 1/2015 | ........... | C04B 24/281 |
| JP | 2001-10853 A | 1/2001 | | |
| JP | 2008-504987 A | 2/2008 | | |
| JP | 2008-254996 A | 10/2008 | | |
| JP | 2008-266130 A | 11/2008 | | |
| WO | 2006/004813 A2 | 1/2006 | | |
| WO | 2012/162292 A2 | 11/2012 | | |
| WO | 2015/028547 A1 | 3/2015 | | |
| WO | WO-2015028547 A1 * | 3/2015 | ........... | C04B 24/383 |

OTHER PUBLICATIONS

Office Action issued in Colombian Patent Application No. NC2018/0005184.

Feb. 27, 2020 Office Action issued in Colombian Patent Application No. NC2018/0005184.

Apr. 24, 2018 International Preliminary Report on Patentability issued in International Patent Application No. PCT/EP2016/074842.

Jan. 13, 2017 International Search Report issued in International Patent Application No. PCT/EP2016/074842.

Aug. 11, 2020 Office Action issued in Chinese Patent Application No. 201680061440.5.

Mar. 11, 2021 Office Action issued in Chinese Patent Application No. 201680061440.5.

"Handbook of Concrete Admixture and Applications Thereof", Zhang Bing Tianjin University Press, p. 175, Nov. 30, 2012.

* cited by examiner

ADDITIVE FOR INTERNAL POST TREATMENT OF MINERAL BINDER COMPOSITIONS

TECHNICAL FIELD

The invention relates to an admixture for mineral binder compositions, in particular an after-treatment agent for mineral binder compositions, and the use thereof. The invention further relates to a mineral binder composition containing the admixture, shaped bodies obtainable therefrom and a process for producing the mineral binder composition.

PRIOR ART

The density of the binder matrix is decisive for the quality and durability of cured mineral binder compositions, e.g. concrete or mortar.

Durable products based on cured mineral binder compositions are characterized not only by their compressive strength. The water impermeability, in particular in the regions close to the surface, is even more important. The lower the porosity and the more impermeable the regions close to the surface, the higher the resistance against external influences, stresses and attacks.

However, this is achieved only when specific measures are undertaken to protect freshly made up binder compositions, e.g. fresh concrete, against: (i) premature drying out by wind, sun, low atmospheric humidity, (ii) extreme temperatures (cold, heat) and rapid temperature changes, (iii) rain, (iv) thermal and physical shocks, (v) chemical attacks and (vi) mechanical stresses. Such measures are also referred to as "after-treatment".

Premature drying out in particular, which, inter alia, impairs the strength development of the cured mineral binder composition, is in practice a serious problem. If no measures are undertaken in this respect, there is a risk of low strengths in the regions close to the surface, a tendency for sanding-off, greater water permeability, reduced weathering resistance, lower resistance to chemical attacks, formation of early shrinkage cracks and an increased risk of later shrinkage crack formation.

To avoid premature drying out, freshly made up binder compositions, for example fresh concrete, are therefore usually subjected to an after-treatment. Known after-treatment methods include, inter alia, application of liquid after-treatment agents (e.g. Sika® Antisol® E-20), leaving in the shuttering, covering with membranes, application of water-containing coverings, continuous spraying with water or underwater storage and also combinations of these methods.

The use of admixtures, which are added to the mineral binders during mixing with water and counter premature drying out, is likewise known. This method is referred to as "internal after-treatment" or "internal curing".

In this context, WO 2015/028547 A1 (Cemex Research Group AG) describes, for example, processes in which cement components, an agent for internal after-treatment and surface-active substances are milled together. The agent for internal after-treatment here consists of cellulose fibers which are dispersed by means of the surface-active substances. The comilling of the after-treatment agent with the cement components is said to give a more stable and more efficient behavior in the after-treatment.

However, previously known methods and agents for the after-treatment of mineral binder compositions are frequently expensive to produce, complicated in use or are not fully convincing in respect of the effect. There is therefore still a need for new and more advantageous methods and agents for the after-treatment of mineral binder compositions.

BRIEF DESCRIPTION OF THE INVENTION

It is therefore an object of the invention to overcome the abovementioned disadvantages. In particular, an improved agent for the after-treatment of mineral binder compositions should be provided. The agent should be able to be used for internal after-treatment and if possible have no adverse effect on the workability, the setting behavior and also the strengths of the binder compositions. Furthermore, advantageous methods, uses and binder compositions which allow efficient after-treatment should be provided.

It has surprisingly been found that the object of the invention can be achieved according to claim 1 by means of an admixture for mineral binder compositions, in particular an after-treatment agent for mineral binder compositions, comprising a water-absorbing substance and a shrinkage reducer.

As has been found in experiments, the admixtures according to the invention can be used as efficient and extremely effective agents for the internal after-treatment or the internal curing of mineral binder compositions. Experiments have shown that the admixtures influence the shrinkage behavior of mineral binder compositions, e.g. concrete compositions, in a positive way and reduce crack formation to a significant extent. The latter applies both during the setting and curing period and also in the cured state. Undesirable drying-out of the mineral binder compositions can be avoided effectively. At the same time, the admixtures of the invention do not significantly impair, or do not at all impair, the workability, the setting and the strengths of cured binder compositions. The admixtures can, for example, be added directly to the tempering water. Preceding premilling with cement components is therefore not necessary, which greatly simplifies use. Furthermore, it has been found that the admixtures are compatible with other and typical admixtures for mineral binder compositions.

Further aspects of the invention are subject matter of further independent claims. Particularly preferred embodiments of the invention are subject matter of the dependent claims.

WAYS OF CARRYING OUT THE INVENTION

A first aspect of the present invention relates to an admixture for mineral binder compositions, in particular an after-treatment agent for mineral binder compositions, comprising at least one water-absorbing substance and at least one shrinkage reducer.

Here, a "mineral binder" is in particular a binder, in particular an inorganic binder, which reacts in the presence of water in a hydration reaction to form solid hydrates or hydrate phases. This can be, for example, a hydraulic binder (e.g. cement or hydraulic lime), a latently hydraulic binder (e.g. slag or slag sand), a pozzolanic binder (e.g. fly ash, trass or rice hull ash) and/or a nonhydraulic binder (gypsum or white lime). Mixtures of the various binders are also possible.

In particular, the mineral binder or the binder composition contains a hydraulic binder, preferably cement. Particular preference is given to a cement having a cement klinker content of 35% by weight. The cement is in particular of the type CEM I, CEM II, CEM III, CEM IV, CEM V (in accordance with the standard EN 197-1). The mineral binder is more particularly cement of the type CEM I and/or CEM II.

The proportion of the hydraulic binder in the total mineral binder is advantageously at least 5% by weight, in particular at least 20% by weight, preferably at least 35% by weight, especially at least 65% by weight. In a further advantageous embodiment, the mineral binder consists to an extent of at least 95% by weight of hydraulic binder, in particular cement.

However, it can also be advantageous for the binder composition to contain other binders in addition to or instead of a hydraulic binder. These are in particular latently hydraulic binders and/or pozzolanic binders. Suitable latently hydraulic and/or pozzolanic binders are, for example, slag, fly ash and/or silica dust. The binder composition can likewise contain inert materials such as ground limestone, quartz flour and/or pigments. In an advantageous embodiment, the mineral binder contains 5-95% by weight, in particular 5-65% by weight, especially 15-35% by weight, of latently hydraulic and/or pozzolanic binders.

For the purposes of the present invention, a "cementitious binder" is, in particular, a binder or a binder composition having a proportion of at least 5% by weight, in particular at least 20% by weight, preferably at least 35% by weight, especially at least 65% by weight, of cement.

The water-absorbing substance and the shrinkage reducer can in principle be present independently of one another, for example in separate containers, as two-component or multicomponent admixture. However, preference is given to the water-absorbing substance and the shrinkage reducer being present in mixed formed, in particular in a common container. In this case, the admixture is a one-component admixture.

The at least one water-absorbing substance and the at least one shrinkage reducer are, in particular, chemically different.

In an advantageous embodiment of the invention, the water-absorbing substance comprises at least one representative of the group consisting of superabsorbent polymers, sheet silicates, starch and cellulose. For the present purposes, the term "starch" refers to both unmodified and modified starch. Unmodified starch is a polysaccharide which has the formula $(C_6H_{10}O_5)_n$ and consists essentially of α-D-glucose units. The parameter "n" indicates the average number of repeating units. The expression "modified starch" is known per se to a person skilled in the art. The term encompasses, in particular, physically, enzymatically and/or chemically modified starches.

Superabsorbent polymers are also referred to as superabsorbents. They are preferably polyacrylates or copolymers of acrylic acid and sodium acrylate.

In an advantageous embodiment of the invention, the water-absorbing substance comprises or consists of at least one sheet silicate. This is in particular a sheet silicate containing magnesium. The sheet silicate is particularly preferably selected from the group consisting of vermiculite, palygorskite and/or sepiolite. In particular, it is vermiculite.

Such compounds have, in combination with a shrinkage reducer, been found to be particularly effective agents for internal after-treatment.

In another advantageous embodiment, the water-absorbing substance comprises starch, in particular modified starch, or consists of this. The modified starch advantageously comprises at least one starch ether, in particular hydroxyalkyl starch. Hydroxypropyl starch is especially advantageous. The starch ether is obtainable, in particular, by chemical reaction of unmodified starch with an alkylene oxide, in particular a propylene oxide. This is known per se to a person skilled in the art. Appropriate starch ethers are also commercially available from various suppliers. Modified starch in particular, especially in the form of starch ether or hydroxyalkyl starch, has been found to be very particularly preferred in the present context.

In particular, the water-absorbing substance comprises vermiculite and/or starch. The starch is in particular modified starch as described above, e.g. in the form of starch ether, in particular hydroxyalkyl starch or hydroxypropyl starch.

In another advantageous embodiment, the water-absorbing substance comprises both starch and cellulose. The starch is here in particular modified starch as described above, e.g. in the form of starch ether, in particular hydroxyalkyl starch or hydroxypropyl starch.

The shrinkage-reducing substance is advantageously selected from among alcohols, monoalcohols, glycols, diols, alkanediols, alkenediols, polyols, alkanolamines and/or polyalkylene oxides. Correspondingly, mixtures of these substances are also possible.

Polyols, preferably diols, have been found to be particularly suitable as shrinkage-reducing substance. Polyols or diols having 2-15, preferably 3-10, particularly preferably 4-6, carbon atoms are especially advantageous. They are advantageously alkane polyols or alkanediols. These consist of linear or branched carbon chains which bear precisely two hydroxy groups at different places. However, they do not contain any other heteroatoms or multiple bonds. Diols are particularly advantageous in each case.

Particularly preferred shrinkage-reducing substances are ethylene glycol, diethylene glycol, propylene glycol, dipropylene glycol, butyl diglycol, neopentyl glycol and/or hexylene glycol. Hexylene glycol and/or neopentyl glycol, in particular neopentyl glycol, are very particularly advantageous.

The following embodiments of the invention have been found to be especially advantageous:

a) The shrinkage-reducing substance comprises a diol, in particular an alkanediol, and the water-absorbing substance comprises vermiculite and/or starch. The water-absorbing substance here is in particular modified starch in the form of starch ether, hydroxyalkyl starch and/or hydroxypropyl starch.

b) The shrinkage-reducing substance comprises hexylene glycol and/or neopentyl glycol and the water-absorbing substance comprises vermiculite and/or starch. The water-absorbing substance here is in particular modified starch in the form of starch ether, hydroxyalkyl starch and/or hydroxypropyl starch.

c) The shrinkage-reducing substance comprises neopentyl glycol and the water-absorbing substance comprises vermiculite and/or starch. The water-absorbing substance here is in particular modified starch in the form of starch ether, hydroxyalkyl starch and/or hydroxypropyl starch.

d) The shrinkage-reducing substance comprises neopentyl glycol and the water-absorbing substance comprises vermiculite.

e) The shrinkage-reducing substance comprises neopentyl glycol and the water-absorbing substance comprises starch, in particular modified starch. The water-absorbing substance here is in particular modified starch in the form of starch ether, hydroxyalkyl starch and/or hydroxypropyl starch.

A weight ratio of the shrinkage-reducing substance to the water-absorbing substance is generally advantageously 5:95-99:1, preferably 25:75-98:2.

If the water-absorbing substance comprises or consists of starch, in particular modified starch, the weight ratio of the water-absorbing substance to the shrinkage-reducing substance is preferably in the range 1:99-50:50, preferably 3:97-25:75, in particular 6.5:93.5-20:80, especially 7:93-15:85, very particularly preferably 7.5:92.5-12.5:87.5.

If the water-absorbing substance comprises or consists of a sheet silicate, in particular vermiculite, the weight ratio of the water-absorbing substance to the shrinkage-reducing substance is preferably in the range 50:50-95:5, preferably 55:45-80:20, in particular 60:40-75:25, especially 62:38-70:30.

In general and based on the total weight of the admixture, the shrinkage-reducing substance is, in particular, present in a proportion of 5-99% by weight, preferably 25-98% by weight. The water-absorbing substance is advantageously present in a proportion of 1-95% by weight, preferably 2-75% by weight.

In the case of starch, in particular modified starch, as water-absorbing substance, the proportion of the water-absorbing substance based on the total weight of the admixture is advantageously 1-50% by weight, preferably 3-25% by weight, in particular 6.5-20% by weight, especially 7-15% by weight, very particularly preferably 7.5-12.5% by weight.

If the water-absorbing substance comprises or consists of a sheet silicate, in particular vermiculite, the proportion of the water-absorbing substance based on the total weight of the admixture is advantageously 50-95% by weight, preferably 55-80% by weight, in particular 60-75% by weight, especially 62-70% by weight.

Furthermore, the admixture can additionally contain at least one further additive, with the further additive being, in particular, selected from the group consisting of antifoams, dyes, preservatives, flow improvers, plasticizers, accelerators, retarders, air pore formers, shrinkage reducers and/or corrosion inhibitors.

The admixture can also optionally contain a solvent, e.g. water and/or an alcohol.

A further aspect of the present invention relates to a mineral binder composition, in particular a mortar and/or concrete composition, containing a mineral binder and an admixture as described above. The mineral binder is likewise as described above.

The mineral binder composition can be a dry binder composition or a binder composition mixed with water.

The admixture is advantageously present in a proportion, based on the weight of the mineral binder, of 0.01-10% by weight, in particular 0.1-8% by weight, preferably 0.1-5% by weight or 0.5-3% by weight. At such proportions, an optimal effect of the admixture is achieved.

The admixture advantageously further comprises a flow improver, in particular a polycarboxylate ether. If present, the flow improver is advantageously present in a proportion, based on the mineral binder, of 0.01-6% by weight, in particular 0.1-4% by weight, more preferably 0.5-3% by weight. Due to the combination of the admixture of the invention and the flow improver, the workability of the binder composition can be improved and at the same time higher compressive strengths are achieved. As has been found, the flow improver barely impairs the effect of the admixture, if at all.

The flow improver is advantageously a comb polymer comprising a polycarboxylate backbone with polyether side chains bound thereto. The side chains are, in particular, bound via ester, ether and/or amide groups to the polycarboxylate backbone.

Corresponding polycarboxylate ethers and production processes are, for example, disclosed in EP 1 138 697 B1 on page 7, line 20 to page 8, line 50, and in the examples therein, or in EP 1 061 089 B1 on page 4, line 54 to page 5, line 38, and in the examples therein. In a modification thereof, as is described in EP 1 348 729 A1 on page 3 to page 5 and in the examples therein, the comb polymer can be prepared in the solid state.

The disclosure of these patent documents mentioned is hereby, in particular, incorporated by reference.

Such comb polymers are also commercially marketed by Sika Schweiz AG under the series trade name ViscoCrete®.

In a further preferred embodiment, the binder composition additionally contains solid aggregates, in particular gravel, sand and/or crushed rock fractions. Such binder compositions can, for example, be used as mortar mixtures or concrete mixtures.

In particular, the binder composition additionally contains water, with a weight ratio of water to mineral binder preferably being in the range 0.25-0.8, in particular 0.3-0.6, preferably 0.35-0.5. Such binder compositions can be processed directly as mortar mixtures or concrete mixtures.

An additional aspect of the present invention relates to a shaped body which is obtainable by curing of a binder composition as described above after addition of water. The shaped body produced in this way can have virtually any shape and can be, for example, constituent of a building construction, e.g. a building, a masonry construction or a bridge.

An additional aspect of the invention relates to the use of at least one water-absorbing substance and at least one shrinkage reducer or of an admixture according to the invention for the internal after-treatment of a mineral binder composition. The at least one water-absorbing substance, the at least one shrinkage reducer and the mineral binder composition are here defined as described above.

In particular, the admixture according to the invention can be used as agent for the internal after-treatment of a mineral binder composition.

The admixture of the invention is likewise suitable for reducing shrinkage of a mineral binder composition, in particular during the setting and/or curing period.

The use of the admixture of the invention for reducing drying-out of a mineral binder composition, in particular during the setting and/or curing period, is also advantageous.

Furthermore, the admixture of the invention is suitable for reducing the formation of cracks, in particular during the setting and/or curing period, in a mineral binder composition.

The abovementioned setting and/or curing period here encompasses, in particular, the first 28 days, in particular the first 7 days or the first 2 days, after mixing the mineral binder composition with water.

The use of the admixture of the invention for improving the chemical resistance and/or mechanical strength of a surface of a mineral binder composition is also advantageous.

The mineral binder compositions are here defined as described above.

A person skilled in the art will be able to derive further advantageous embodiments of the invention from the following working examples.

BRIEF DESCRIPTION OF THE DRAWING

The figures used for explaining the working examples show.

WORKING EXAMPLES

1. Substances Used

Figure 1:
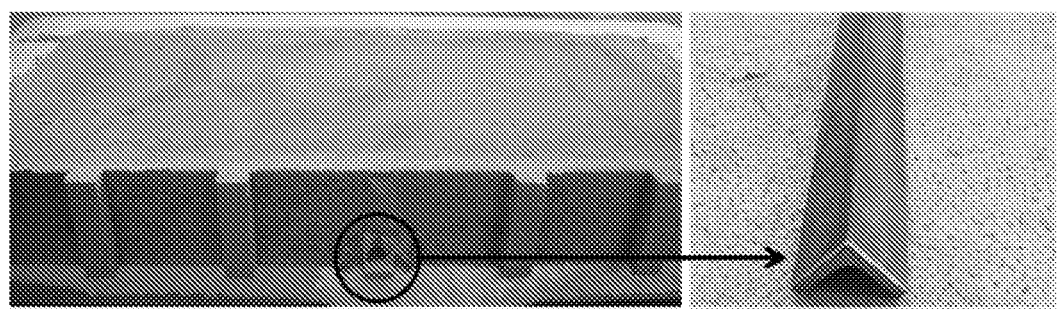
FIG. 1: at left: cuboidal shuttering filled with a mortar mixture and having an L-shaped steel bar running centrally along the entire width; at right: a detailed view of the steel bar.

The following substances were used for the working examples:

TABLE 1

| Designation | Substance |
| --- | --- |
| mS | Hydroxypropyl starch (Emset KH 6; Emsland Stärke GmbH, Germany) |
| SSV | Vermiculite |
| NPG | Neopentyl glycol |
| V1 | Conventional external after-treatment agent based on paraffin (Antisol ® E-20, Sika Schweiz AG) |
| V2 | Conventional internal after-treatment agent based on cellulose (Hidratium ®, Cemex Research Group AG, Switzerland) |

Vermiculite (SSV) and neopentyl glycol (NPG) are commercially available from various suppliers and are used in pure form (purity >97%).

2. Provision of the Admixtures

The admixtures Z1-Z3 according to the invention shown below in Table 2 were produced:

TABLE 2

| Designation | Water-abs. substance/proportion | Shrinkage reducer/proportion |
| --- | --- | --- |
| Z1 | mS/8.16% by weight | NPG/91.84% by weight |
| Z2 | SSV/66.7% by weight | NPG/33.3% by weight |
| Z3 | mS/11.7% by weight | NPG/88.3% by weight |

In all the mortar experiments described below, a modified polycarboxylate in the form of Sika® ViscoCrete®-3081 S was used as flow improver. Sika® ViscoCrete®-3081 S is a comb polymer having a polycarboxylate backbone and polyalkylene oxide side chains attached via ester groups. The flow improver was used in a concentration of 1.0% by weight, based on the binder, and was added beforehand to the tempering water.

3. Mortar Mixtures

The effectiveness of the admixtures according to the invention was tested in mortar mixtures. Mortars as specified in Table 3 were used for this purpose.

TABLE 3

Dry composition of the mortar mixtures used (maximum particle size 8 mm)

| Component | Mixture M1 | Mixture M2 |
| --- | --- | --- |
| CEM I | 750 g | — |
| CEM II A-LL | — | 750 g |
| Limestone filler | 141 g | 141 g |
| Sand 0-1 mm | 738 g | 738 g |
| Sand 1-4 mm | 1107 g | 1107 g |
| Sand 4-8 mm | 1154 g | 1154 g |

For mixture M1, Schweizer CEM I 42.5 N (=mixture of cements Normo 4 [Siggenthal/Holcim AG], Vigier CEM I 42.5N [Vigier Ciment AG] and CEM I 42.5 N [Wildegg/Jura cement] in a weight ratio of 1:1:1) having a Blaine fineness of 3600 $cm^2/g$ was used as cement. The sands, the limestone filler and the cement were mixed dry in a Hobart mixer for 1 minute. The tempering water in which the flow improver (1.0% by weight based on cement) and optionally the admixture Z1-Z3 or V2 had been dissolved or dispersed was added over a period of 30 seconds and the mixture was mixed for a further 2.5 minutes. The total mixing time in each case was 3 minutes. The water/cement value (w/c value) was in the range 0.49-0.55 (see Table 4).

Mixture M2 was produced in the same way but Schweizer CEM II A-LL (Wildegg/Jura cement) was used as cement. The water/cement value (w/c value) was 0.58 (see Table 5).

The proportion of any admixture present based on cement was 0.17% by weight for admixture V2, 0.5% by weight for the admixtures Z1 and Z3 and 1.35% by weight for the admixture Z3. This corresponded to the optimal added amounts for the respective admixtures.

4. Test Methods

Figure 2:
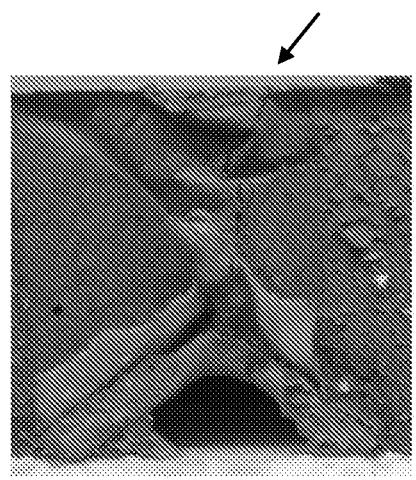
FIG. 2: a side view of a crack in the cured mortar mixture of FIG. 1 above the steel bar. The arrow marks the position of the crack.
Figure 3:
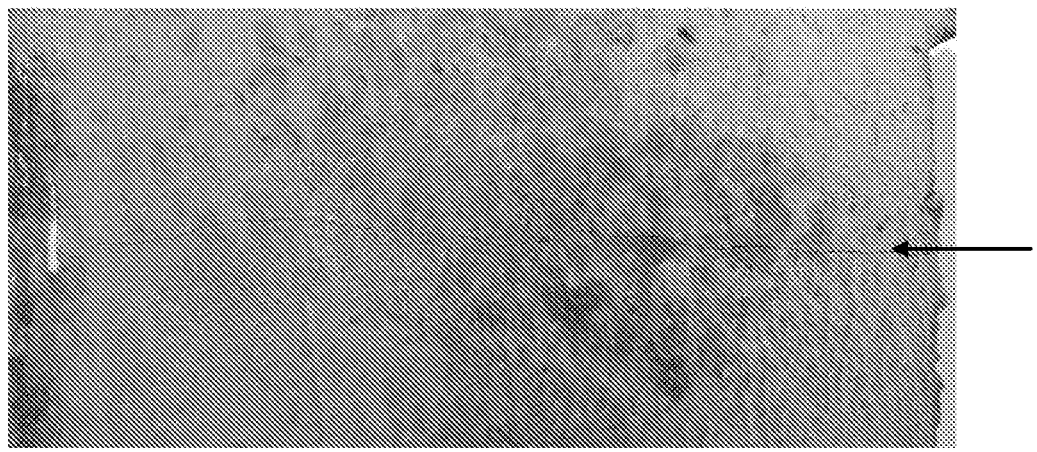
FIG. 3: a plan view of the crack of FIG. 2. The arrow again marks the position of the crack.

To determine the effect of the admixture, cuboidal shuttering (31 cm×16 cm×4 cm) having an L-shaped steel bar running centrally along the entire width (see FIG. 1) was provided in laboratory experiments. The steel bar here served as intended fracture position. The shuttering was then filled with the freshly made up mortar mixtures and stored under defined conditions in an air conditioned chamber having a wind tunnel. Here, the temperature, the relative atmospheric humidity and the wind velocity could all be controlled during storage. After two days, the specimens produced in this way were examined visually for any crack formation (cf. FIGS. 2 and 3).

The shrinkage behavior was tested by a method based on the Swiss standard SIA 262/1 using prisms (120 mm×120 mm×360 mm) at 20° C. and 65% relative atmospheric humidity after 1, 2, 3 and 7 days. The length changes of the prisms observed were accordingly measured in parts per thousand (0/00) relative to the zero specimen (value after 1 day).

The effect of the admixture on the setting behavior of the mortar mixtures was likewise examined by measuring the temperature change over time at an ambient temperature of 20° C. The temperature measurement was carried out in a manner known per se using a thermocouple as temperature sensor. All specimens were measured under the same conditions. In the present case, the time elapsed from mixing the mortar mixture with water to attainment of the maximum temperature occurring after the induction phase or rest phase was employed as measure of the setting time.

In addition, the compressive strengths of the mortar mixtures at various times (1, 7 and 28 days) after mixing of the mortar mixtures with water were determined. The test to determine the compressive strength (in N/mm$^2$) was carried out on prisms (40×40×160 mm) in accordance with the standards EN 12390-1 to 12390-4.

Immediately after mixing of the mortar mixtures with water and also 30 minutes and 60 minutes thereafter, the respective slump flow (SF) was measured. The slump flow (SF) of the mortar was measured in accordance with EN 1015-3.

The air content was determined in accordance with the standard EN 1015-7 (air content) immediately after mixing of the mortar mixture with water.

5. Results 5.1 Crack Formation

Table 4 shows the effect of the admixtures in respect of the avoidance of crack formation under various conditions and use of mortar mixture M1. It is desirable for no cracks to be formed if possible. The experiments were carried out as described above in chapter 4.

In the experiments A-G, admixtures according to the invention were used. For comparative purposes, the reference experiments R1-R8 without or with admixtures which are not according to the invention were additionally carried out. In experiments R4 and R5, the admixture V1 was in each case not added to the mortar mixture but instead used subsequently for external after-treatment as envisaged by the manufacturer.

TABLE 4

| Experiment | Admixture | Mortar mixture | w/c | T [° C.] | Humidity [%] | Wind [km/h] | Cracks after 2 d? |
|---|---|---|---|---|---|---|---|
| R1 | — | M1 | 0.55 | 20 | 40 | 0 | NO |
| R2 | — | M1 | 0.49 | 20 | 40 | 3-7 | Yes |
| R3 | — | M1 | 0.49 | 20 | 40 | 10-12 | Yes |
| R4 | V1 | M1 | 0.49 | 20 | 40 | 3-7 | NO |
| R5 | V1 | M1 | 0.49 | 20 | 40 | 10-12 | NO |
| R6 | V2 | M1 | 0.55 | 20 | 40 | 0 | NO |
| R7 | V2 | M1 | 0.49 | 20 | 40 | 3-7 | NO |
| R8 | V2 | M1 | 0.49 | 20 | 40 | 10-12 | NO |
| A | Z1 | M1 | 0.55 | 20 | 40 | 0 | NO |
| B | Z1 | M1 | 0.49 | 20 | 40 | 3-7 | NO |
| C | Z1 | M1 | 0.49 | 20 | 40 | 10-12 | NO |
| D | Z2 | M1 | 0.55 | 20 | 40 | 0 | NO |
| E | Z2 | M1 | 0.49 | 20 | 40 | 10-12 | NO |
| F | Z3 | M1 | 0.55 | 20 | 40 | 0 | NO |
| G | Z3 | M1 | 0.49 | 20 | 40 | 3-7 | NO |

The results in Table 4 clearly show that the admixtures Z1-Z3 according to the invention perform at least as well in respect of the avoidance of cracks as do known external after-treatment agents (V1) or conventional internal after-treatment agents (V2).

Table 5 shows the results using mortar mixture M2. In experiments H-K, admixtures according to the invention were used. For comparative purposes, reference experiments (R9-R14) without or with admixtures which are not according to the invention were once again carried out. In the case of experiments R11 and R12, the admixture V1 was in each case not added to the mortar mixture but, as prescribed by the manufacturer used subsequently for external after-treatment.

TABLE 5

| Experiment | Admixture | Mortar mixture | w/c | T [° C.] | Humidity [%] | Wind [km/h] | Cracks ? |
|---|---|---|---|---|---|---|---|
| R9 | — | M2 | 0.58 | 20 | 40 | 0 | Yes |
| R10 | — | M2 | 0.58 | 20 | 40 | 3-7 | Yes |
| R11 | V1 | M2 | 0.58 | 20 | 40 | 0 | NO |
| R12 | V1 | M2 | 0.58 | 20 | 40 | 3-7 | NO |
| R13 | V2 | M2 | 0.58 | 20 | 40 | 0 | NO |
| R14 | V2 | M2 | 0.58 | 20 | 40 | 3-7 | Yes |
| H | Z2 | M2 | 0.58 | 20 | 40 | 0 | NO |
| I | Z2 | M2 | 0.58 | 20 | 40 | 3-7 | Yes |
| J | Z3 | M2 | 0.58 | 20 | 40 | 0 | NO |
| K | Z3 | M2 | 0.58 | 20 | 40 | 3-7 | NO |

It can be seen from the data in Table 5 that the admixtures according to the invention also function without problems in other types of cement and sometimes perform even better than the known after-treatment agents. Thus, admixture Z3 effectively prevents crack formation even at wind velocities of 3-7 km/h (see experiment K). However, cracks are present under the corresponding conditions when the conventional agent V2 is used (see experiment R14).

5.2 Shrinkage Behavior

Figure 4:
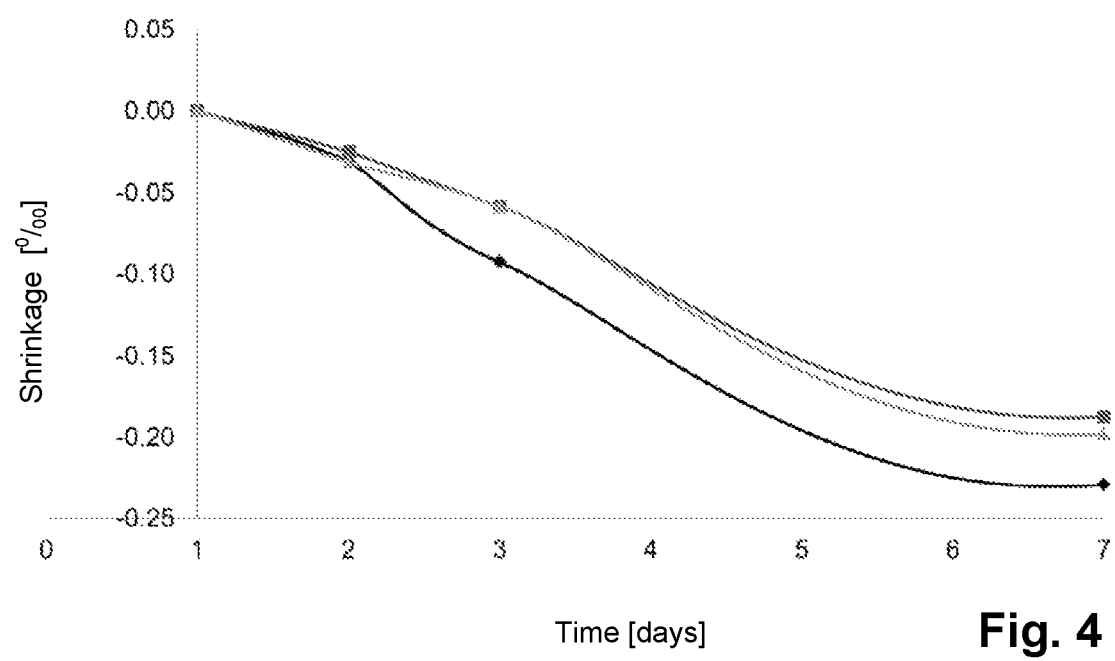
FIG. 4: the shrinkage over time of mortar mixtures without (diamonds) and with an admixture based on vermiculite or neopentyl glycol (squares and triangles, respectively).

The shrinkage behavior was examined using a mortar mixture of the type M2 and an admixture of the type Z2. The mortar mixtures were produced as described in chapter 3. FIG. 4 shows the corresponding results. The upper curves with the data points in the form of squares and triangles here correspond to two series of measurements using admixtures according to the invention of the type Z2. It can be seen from FIG. 4 that the shrinkage behavior is influenced in a positive way compared to a reference specimen without admixture for the after-treatment (curve with the data points in the form of diamonds).

5.3 Workability, Strength and Setting Behavior

To test the influence of the admixtures on the workability, strength and setting behavior, the slump flow (SF), the air content, the point in time of the temperature maximum $t(T_M)$ and the compressive strength were examined as set forth in chapter 4. Table 6 gives an overview of the experiments carried out and the results. Mortar mixture M1 was used for all experiments.

TABLE 6

| Experiment | Admixture | w/c | SF [mm] 0' | SF [mm] 30' | SF [mm] 60' | Air content [%] | $t(T_M)$ [h] | Compressive strength [MPa] 1 d | 7 d | 28 d |
|---|---|---|---|---|---|---|---|---|---|---|
| R15 | — | 0.44 | 195 | 173 | 163 | 2.9 | 16.3 | 27.3 | 58.0 | 63.0 |
| R16 | V2 | 0.49 | 192 | 172 | 163 | 2.8 | 17.8 | 20.0 | 49.6 | 58.2 |
| M | Z1 | 0.49 | 189 | 195 | 199 | 2.9 | 20.2 | 14.3 | 43.6 | 50.2 |

As can be seen from the data in Table 6, the admixtures of the invention barely impair, or do not at all impair, the workability, the strength and the setting behavior of mortar compositions.

It has thus been shown, in particular, that the admixtures of the invention are suitable as efficient and extremely effective agents for the internal after-treatment or internal curing of mineral binder compositions. In particular, the shrinkage behavior of the mineral binder compositions is influenced in a positive way and formation of cracks can be reduced significantly. Undesirable drying-out of mineral binder compositions can thus be avoided effectively. At the same time, the admixtures of the invention only insignificantly impair, or do not at all impair, the workability, the setting and the strength of the binder compositions.

However, the above-described embodiments should be considered to be merely illustrative examples which can be modified as desired within the scope of the invention.

The invention claimed is:

1. A method of treating a mineral binder composition, the method comprising:
    treating the mineral binder composition with an admixture comprising at least one water-absorbing substance and at least one shrinkage reducer by adding the admixture to mineral binder composition,
    wherein the water-absorbing substance is a modified starch, and
    a weight ratio of the modified starch to the shrinkage reducer is in a range of 1:99 to 50:50.

2. The method according to claim 1, wherein the modified starch is a hydroxyalkyl starch.

3. The method according to 1, wherein the shrinkage reducer is selected from among alcohols, monoalcohols, glycols, diols, alkanediols, alkenediols, polyols, alkanolamines and polyalkylene oxides.

4. The method according to claim 3, wherein the shrinkage reducer is selected from among alkanediols.

5. The method according to claim 4, wherein the shrinkage reducer comprises at least one of hexylene glycol and neopentyl glycol.

6. The method according to claim 1, wherein the shrinkage reducer comprises neopentyl glycol and the water-absorbing substance comprises at least one of vermiculite and a modified starch.

7. The method according to claim 1, wherein a weight ratio of the shrinkage reducer to the water-absorbing substance is in a range of 5:95 to 99:1.

8. The method according to claim 1, wherein the admixture further comprises an additive selected from the group consisting of antifoams, dyes, preservatives, flow improvers, plasticizers, accelerators, retarders, air pore formers, shrinkage reducers, and corrosion inhibitors.

9. A mineral binder composition containing a mineral binder and the admixture as claimed in claim 1.

10. A shaped body obtained by curing a mineral binder composition as claimed in claim 9 which has been mixed with water.

11. A process for producing a mineral binder composition, wherein the admixture as claimed in claim 1 is mixed with a mineral binder.

12. The method according to claim 2, wherein the hydroxyalkyl starch is a hydroxypropyl starch.

13. The method according to claim 1, wherein a weight ratio of the modified starch to the shrinkage reducer is in a range of 7.5:92.5 to 12.5:87.5.

* * * * *

UNITED STATES PATENT AND TRADEMARK OFFICE
CERTIFICATE OF CORRECTION

| | | |
|---|---|---|
| PATENT NO. | : 11,161,791 B2 | Page 1 of 1 |
| APPLICATION NO. | : 15/765991 | |
| DATED | : November 2, 2021 | |
| INVENTOR(S) | : Burge et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 527 days.

Signed and Sealed this
Fourteenth Day of February, 2023

*Katherine Kelly Vidal*

Katherine Kelly Vidal
*Director of the United States Patent and Trademark Office*